United States Patent Office 2,758,143
Patented Aug. 7, 1956

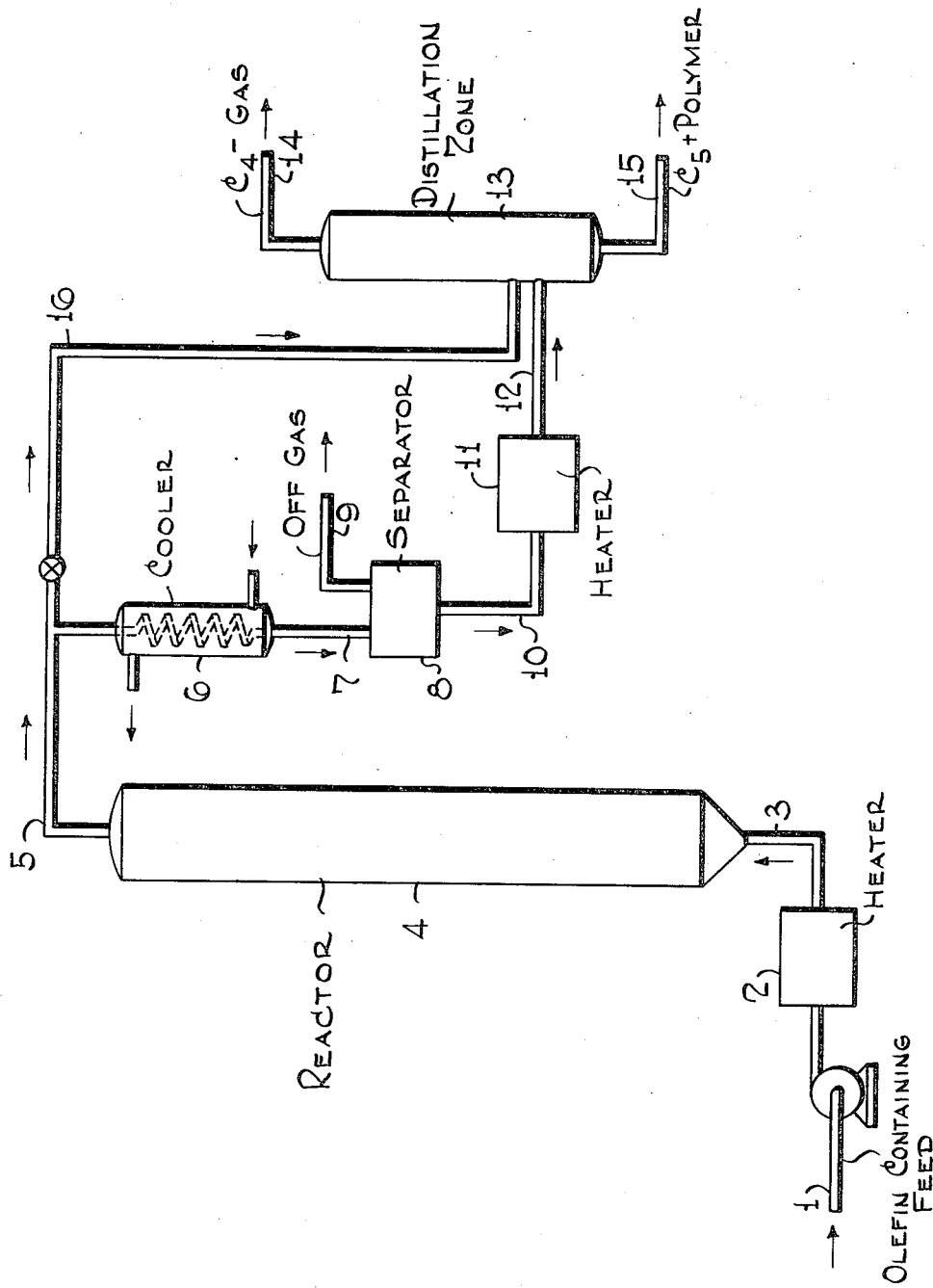

2,758,143
OLEFIN POLYMERIZATION PROCESS

Erving Arundale and Byron M. Vanderbilt, Westfield, N. J., assignors to Esso Research and Engineering Company, a corporation of Delaware Application October 1, 1951, Serial No. 249,194

16 Claims. (Cl. 260—683.15)

The present invention is concerned with an improved process for polymerizing olefins. The invention is more particularly concerned with the polymerization of olefins wherein the olefin containing gases are contacted with a particular liquid catalyst comprising an acid of phosphorus. In accordance with the present invention, an olefin polymerization reaction is carried out in a reactor utilizing phosphoric acid as a catalyst wherein efficient contact and high conversions are obtained by mixing the phosphoric acid with an organic phosphate.

It is well known in the art to use various phosphoric acid type catalysts supported on suitable solid carriers for carrying out polymerization reactions. For instance, it is well known in the art to treat olefins and olefin-containing streams with various catalysts, as for example, with acids of phosphorus in order to polymerize the olefins to higher boiling hydrocarbon constituents useful as motor gasoline or chemical raw materials. In general, the feed streams comprise normally gaseous olefins, such as propylene, butylenes, pentylenes, and mixtures thereof, which are polymerized to hydrocarbon constituents which boil in the range below about 430° F. Although pure olefinic streams may be utilized as feed stocks, it is generally preferred to have paraffinic diluents present in a concentration in the range of from about 20% to 80% by weight in order to reduce the formation of carbonaceous deposits on the catalyst and to provide better temperature control in the catalyst bed.

The phosphoric acid catalyst is usually deposited on solid carriers, as for example, kieselguhr, diatomaceous earth, precipitated silica, silica gel, and the like. In general, these supported catalysts are satisfactory for securing polymerization of the olefins in the feed stream. However, there exist certain inherent disadvantages with respect to their use in that their structural strength is relatively low, resulting in disintegration of the supported catalysts and excessive pressure build-up, thereby necessitating discontinuing the operation. This disintegration of the catalyst is particularly harmful in a fixed bed type of operation, especially wherein the catalyst is disposed in relatively long tubular elements having relatively small diameters. In addition, polymerization reactions over such solid catalysts are normally carried out under high pressures of the order of about 500 to 1000 p. s. i. g. in order to obtain the desired contact between feed and catalyst. Efficient contact between the feed and catalyst is necessary if high conversions of the olefins to liquid polymer are to be obtained. By employing the process and improved catalyst of the present invention, it is possible to obtain high olefin conversion and high yields of liquid polymer at lower pressures as for example at atmospheric pressure.

In accordance with the present invention, an improved polymerization operation is conducted by utilizing a catalyst comprising phosphoric acid in admixture with an organic phosphate. Furthermore, the catalyst is handled in such a manner that the olefin-containing gases contact the phosphoric acid in an efficient manner. The present invention may be more fully understood by reference to the accompanying figure illustrating one embodiment of the same.

Referring to the drawing, the olefin containing feed is passed through line 1 into heater 2 where the temperature is raised to the desired level. The heated feed is removed from the heater zone 2 by means of line 3 and introduced into reactor zone 4. Reactor zone 4 contains the mixture of phosphoric acid and organic phosphate which is heated to the desired polymerization temperature. To increase contact between the feed and catalyst in zone 4, the reactor may be loaded with an inert material such as porcelain, carbon or the like, or the catalyst may be agitated by any suitable mixing device, for example, a stirrer. The catalyst mixture in reactor zone 4 is maintained at a temperature sufficient to cause polymerization of the olefin in the feed but below the normal boiling point of the organic phosphate in the catalyst mixture. Unreacted gas and polymer are removed from zone 4 by means of line 5, usually by distillation, and introduced in cooler 6, thence by line 7 into separator 8. In separator 8 the gas is removed by line 9 while the liquid polymer product is removed by means of line 10 and passed to heater 11. The temperature of the product is raised in heater 11 and introduced into fractionating column 13 by means of line 12. Hydrocarbons having four carbon atoms in the molecule and lower boiling hydrocarbons are removed overhead from fractionating column 13 by means of line 14. Hydrocarbons having five carbon atoms in the molecule and higher boiling polymers are removed by means of line 15. This $C_5+$ polymer can be further fractionated to separate material boiling above approximately 430° F. This high boiling material may be recycled to reactor zone 4 if desired. Under certain operating conditions it may be desirable to bypass cooler 6, separator 8 and heater 11 and introduce the unreacted gas and polymer product which leaves reactor zone 4 by means of line 5 directly into fractionating column 13 by means of line 16.

Another modification of the process would be to contact the heated feed and catalyst while the two are flowing concurrently through a heated reactor. The polymer and unconverted gas can then be separated from the catalyst and the latter recycled.

The catalyst mixture of the present invention is prepared by mixing phosphoric acid of 95-105 weight percent concentration with a polar organic compound which is inert under the polymerization conditions, specifically an organic phosphate. Mixing is carried out quite efficiently using a high speed agitator although other means, for example, recycle pumping, can be employed in the preparation of the catalyst mixture.

The organic phosphates used in accordance with the present invention comprise the mono, di or tri alkyl or aryl phosphates or mixtures thereof, which phosphates possess the following general formula:

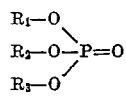

wherein $R_1$ represents an alkyl, aryl, aralkyl or alkaryl radical containing 1–18 carbon atoms and wherein $R_2$ and $R_3$ represent alkyl, aryl, aralkyl or alkaryl radicals containing 1–18 carbon atoms or $R_2$ and $R_3$ represent hydrogen atoms. Preferred compounds are the tri-aryl phosphates, wherein $R_1$, $R_2$, and $R_3$ contain from about 6 to 9 carbon atoms in the group. It is also preferred that the aryl groups contain from 1 to 3 alkyl groups wherein each alkyl group contains from 1 to 4 carbon atoms in the group.

These organic phosphates may be prepared by any suitable procedure as for example by the reaction of aliphatic alcohols, phenol or alkylated phenols with phosphorous pentoxide or with phosphorous oxychloride followed by hydrolysis. As pointed out for the purpose of this invention, the mono, di or tri aryl phosphates are particularly preferred although other high boiling polar compounds such as the alkyl or aryl phosphites may also be used. A particularly useful catalytic mixture comprises one prepared by reacting phenol or petroleum phenols with phosphorous oxychloride followed by hydrolysis to form the mono, di or tri phenyl phosphates or a mixture thereof. The by-product hydrogen chloride is separated and the 95–105% phosphoric acid is added. Olefin feed is then added to alkylate the aromatic ring, and the catalyst is allowed to come to equilibrium at polymerization temperature.

Other organic phosphates which may be employed in the catalyst mixture include the mono, di or tri esters of phenol, cresol, xylenol, tri methyl phenol, tri tertiary butyl phenol, tri propyl phenol or other alkylated phenols which esters can be prepared as described above or secured from other sources.

The polymerization process of the present invention which employs the improved catalyst is particularly applicable to hydrocarbon feeds containing $C_3$ and $C_4$ olefins by themselves, mixtures thereof, or diluted with $C_3$ and $C_4$ paraffin hydrocarbons, which hydrocarbon mixtures can be produced in thermal or catalytic cracking operations employing petroleum oil feeds. The polymers produced, utilizing the present catalyst possess high octane numbers and can be blended with other refinery products to produce motor or aviation gasolines. These polymers are also valuable as chemical raw materials in that they can be reacted for example with carbon monoxide and hydrogen to form alcohols or with aromatic hydrocarbons to form detergent alkylate and the like.

The polymerization operation is preferably carried out by contacting an olefin containing hydrocarbon feed with the phosphoric acid-organic phosphate catalyst in any suitable manner at a temperature between about 200–450° F., preferably at a temperature between about 240–360° F. and at a pressure between atmospheric and 1000 p. s. i. g., particularly from atmospheric to 500 p. s. i. g. The olefin containing feed is contacted with the catalyst at such a rate as to insure high olefin conversions which feed rates are usually from about 0.1 to 2.5 volumes of liquid olefin per volume of catalyst mixture per hour. In order to secure intimate contact between the feed and catalyst mixture, suitable emulsifying or dispersing agents in a concentration between 0.5–5 weight percent based on the catalyst mixture may be added to the catalyst.

The present invention will be more fully understood by the following examples illustrating the same.

EXAMPLE I

A hydrocarbon feed comprising olefins having the following analysis was polymerized in different operations as hereinafter described:

| | Mol Percent | Weight Percent |
|---|---|---|
| Ethylene | 0.2 | 0.11 |
| Propylene | 26.2 | 22.14 |
| Propane | 27.5 | 24.36 |
| Isobutane | 15.5 | 18.10 |
| N-butane | 9.3 | 10.86 |
| Isobutylene | 6.5 | 7.33 |
| 1 butene | 4.7 | 5.30 |
| t 2 butene | 5.0 | 5.64 |
| c 2 butene | 3.7 | 4.17 |
| Butadiene | 0.1 | 0.10 |
| Iso and n. pentanes | 0.6 | 0.87 |
| $C_4$ Unsaturates | 0.6 | 0.84 |
| $C_5+$ hydrocarbons | 0.1 | 0.17 |

Olefin content=47% by volume.

This olefin feed was passed at atmospheric pressure and at the rate of 0.28 liter (gas) per minute through 502 grams of 97–98 weight percent phosphoric acid in a reactor equipped with a stirrer. Operations were conducted at 239° F. and 293° F. The percent olefin conversion was determined by an Orsat analysis on the product gases. The following results were obtained:

| | Polymerization Temperature, ° F. | Percent Olefin Conversion by Orsat Analysis |
|---|---|---|
| Operation 1 | 239 | 23–28 |
| Operation 2 | 293 | 28–32 |

Additional runs were carried out under the same conditions as above but the catalyst consisted of 506 grams of 97–98% $H_3PO_4$ and 326 grams of tricresyl phosphate. The results of these operations are as follows:

| | Polymerization Temperature, ° F. | Percent Olefin Conversion by Orsat Analysis |
|---|---|---|
| Operation 3 | 239 | 50–52 |
| Operation 4 | 293 | 63–66 |

It is evident that phosphoric acid in combination with the tricresyl phosphate gave about 100% increase in the olefin conversion as compared with the use of a phosphoric acid catalyst alone.

EXAMPLE II

A hydrocarbon mixture similar in composition to that utilized in Example I and comprising hydrocarbons containing 3 and 4 carbon atoms in the molecule and containing 48 volume percent olefins was passed in one operation through 100% $H_3PO_4$. In other operations the catalyst comprised phosphoric acid and phosphates. The polymerization was carried out in a stirred vessel for 2¾ hours at a temperature of 239° F. The temperature was then raised to 293° F. for a period of 2 hours. A portion of the polymer distilled overhead and the remainder was recovered from the catalyst in the reactor. Orsat analyses were obtained during the course of the runs to determine the olefin conversion and the amount of off gas was measured in a wet test meter. The results are presented in the following table.

Low pressure polymerization operations

General conditions:
C₃/C₄ feed containing 48.3 vol. percent olefins.
Gaseous feed rate=0.35–0.37 liters/minute.
Atmospheric pressure.
Run length, 2¾ hours at (239° F.) then 1 hour and 55 minutes at (293° F.).

| Operation No. | Catalyst | Vol. of Cat., cc. | Temp., °F. | Off Gas, l./Min. | Olefin Conv. (by Orsat), percent | Weight Polymer Distillate, g. | Weight Polymer in Reactor, g. | Total Off Gas, l. |
|---|---|---|---|---|---|---|---|---|
| I | 506 gms. 100% H₃PO₄ | 272 | 239 / 293 | 0.344 / 0.338 | 28–29 / 35–36 | 12.8 (Total Poly. 23.8 g.) | 11.0 | 94.85 |
| II | 379.0 gms. of mixture containing 64.3 wt. percent 100% H₃PO₄+35.7 wt. percent of a high boiling petroleum oil (contains 244 gms. of H₃PO₄). | 284 | 239 / 293 | 0.335 / 0.331 | 25.5–26 / 32–34.5 | 18.2 (Total Poly. 18.2 g.) | 0 | 92.02 |
| III | 413 gms. of mixture containing 58 wt. percent 100 percent H₃PO₄+42 wt. percent tri xylenyl phosphate (contains 240 gms. H₃PO₄). | 280 | 239 / 293 | 0.267 / 0.262 | 57–59 / 60–61 | 42.5 (Total Poly. 61.6 g.) | 19.1 | 74.0 |
| IV | 829.4 gms. of mixture containing 58 wt. percent 100% H₃PO₄+42 wt. percent tri xylenly phosphate (contains 480 gms. H₃PO₄). | 562 | 239 / 293 | 0.256 / 0.246 | 70–73 / 69.5–72 | 27.2 (Total Poly. 69.6 g.) | 42.4 | 70.6 |

It will be noticed that the use of 100% H₃PO₄ per se as a catalyst at atmospheric pressure and temperatures of 239° F. and 293° F. results in low olefin conversions (28–36%) and low polymer yields. In operation II the use of an equivalent volume of total catalyst but in the form of a mixture with inert oil results in still lower conversions and polymer yields. On the other hand, in operation III, when substituting trixylenyl phosphate, the olefin conversion (57–61%) and yield of liquid polymer are at least double those which can be realized, under comparable operating conditions, with H₃PO₄ by itself as the catalyst. In operation IV, by doubling the volume of the H₃PO₄, trixylenyl phosphate catalyst resulted in a further increase in olefin conversion (70–73%) and liquid polymer yield.

While the applicants do not wish to be restricted as to theory of operation, it is believed the superiority of the phosphoric acid-polar organic compound mixtures over phosphoric acid alone as a polymerization catalyst is due to several factors. The phosphoric acid forms a good dispersion or emulsion in the organic phosphate which presents a greater surface area of the acid catalyst to the olefin feed gas and thereby improves the contact. The triaryl phosphates react with the 100% phosphoric acid to form a mixture of mono- and di-aryl acid phosphates which mixture with phosphoric acid is a more active polymerization catalyst than phosphoric acid alone. The phosphate portion of the mono, di or tri aryl phosphate molecule is soluble in the phosphoric acid and the aryl portion of the molecule compatible with the feed thereby effecting improved contact between the feed and acid catalyst. This is apparently the case since solubility determinations have indicated that both 100% H₃PO₄ and hydrocarbons have an appreciable solubility in the trixylenyl phosphate. For this reason, phosphoric acid can be dissolved in such a mutual solvent as an aryl phosphate and the feed passed through the homogeneous solution at an elevated temperature taking the polymer off overhead as it is formed.

The concentration of the organic phosphate in the catalyst mixture may vary appreciably depending upon operating conditions, the particular organic phosphate utilized, and upon other variables. However, in general, it is preferred to use from 20% to 70% by weight of the organic phosphate in conjunction with from about 30% to 80% by weight of the phosphoric acid. A preferred concentration of the organic phosphate on this basis is from about 40% to 60% by weight.

What is claimed is:

1. An improved process for polymerizing olefins which comprises contacting the olefins under polymerization conditions with a mixture of a inorganic acid of phosphorus and a hydrocarbon ester of phosphoric acid containing at least one aromatic hydrocarbon substituent group.

2. Process as defined by claim 1 wherein said hydrocarbon ester has the following general formula:

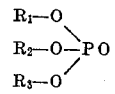

wherein R₁, R₂, and R₃ are selected from the group consisting of hydrocarbon radicals having from 1 to 18 carbon atoms in the radical and hydrogen and at least one of the R groups is an aryl radical.

3. Process for polymerizing olefins utilizing a phosphoric acid which comprises contacting the olefins with said phosphoric acid in admixture with an aryl hydrocarbon phosphate selected from the group consisting of mono, di, and tri aryl phosphates, wherein the aryl group contains from 6 to 9 carbon atoms in the group.

4. A process for polymerizing C₃–C₄ olefins which comprises contacting said olefins with a catalyst comprising a mixture of 95–105% phosphoric acid and a hydrocarbon phosphate ester containing at least one aryl group having from 6 to 9 carbon atoms at a temperature between about 240–450° F. and at a pressure from atmospheric to 500 p. s. i. g. and removing the polymer as it is formed.

5. Process as defined by claim 4 wherein said phosphate comprises trixylenyl phosphate.

6. Process as defined by claim 4 wherein said phosphate comprises tricresyl phosphate.

7. Process as defined by claim 4 wherein said catalyst contains in the range of about 20 to 70% by weight, based on the total composition, of said phosphate ester.

8. As an improved catalyst composition, a mixture of a phosphoric acid and from 20 to 70% a hydrocarbon ester of an inorganic acid of phosphorus containing at least one aromatic hydrocarbon substituent group.

9. A composition as defined in claim 8 wherein said hydrocarbon ester has the following general formula:

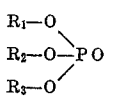

wherein R₁, R₂, and R₃ are selected from the group consisting of hydrocarbon radicals having from 1 to 18 carbon atoms in the radical and hydrogen, and at least one of said R groups is an aryl radical.

10. As an improved catalyst composition, an emulsion formed by mixing a phosphoric acid and a hydrocarbon ester of an inorganic phosphoric acid, said ester containing at least one aryl radical having in the range of 6 to 18 carbon atoms, said composition containing from about 20 to about 70% of said ester.

11. A composition as defined by claim 10, wherein each aryl radical has in the range of 6 to 9 carbon atoms.

12. A composition as defined by claim 11 wherein said aryl groups are alkaryl groups.

13. A composition as defined by claim 12 wherein said acid is 95 to 105% phosphoric acid.

14. A composition as in claim 13 wherein said aryl phosphate is trixylenyl phosphate.

15. A composition as in claim 13 wherein said aryl phosphate is tricresyl phosphate.

16. A process for polymerizing normally gaseous olefins to form liquid polymers which comprises contacting said olefins at polymerizing conditions with a catalyst emulsion consisting of 95–105% phosphoric acid and tricresyl phosphate, said phosphate being present in an amount in the range of about 20 to 70% by weight based on the total emulsion.

References Cited in the file of this patent

UNITED STATES PATENTS

| | | |
|---|---|---|
| 2,470,175 | Linn | May 17, 1949 |
| 2,592,428 | Kemp et al. | Apr. 8, 1952 |
| 2,614,136 | Koffenbach et al. | Oct. 14, 1952 |

FOREIGN PATENTS

| | | |
|---|---|---|
| 340,513 | Great Britain | Dec. 22, 1930 |
| 450,592 | Great Britain | July 20, 1936 |
| 790,945 | France | Nov. 29, 1935 |